INVENTOR
ERNEST W. REID
BY
Chas. C. Scheffler
ATTORNEY

Patented June 14, 1938

2,120,628

UNITED STATES PATENT OFFICE 2,120,628

LAMINATED GLASS

Ernest W. Reid, Brussels, Belgium, assignor to Union Carbide and Carbon Corporation, a corporation of New York Application March 25, 1937, Serial No. 132,953
In Australia March 27, 1936

9 Claims. (Cl. 49—81)

This invention is directed to laminated glass structures of the type known as nonshattering or safety glass.

Nonshattering laminated glass structures in which at least one layer of glass is bonded to a layer of less brittle or plastic material are known. In making such composite structures the primary difficulty encountered is that of securing adequate adhesion between the glass and the plastic members of the structure. It is not only necessary for the glass and plastic portion to adhere strongly to each other, but this adhesion must persist indefinitely throughout all conditions to which the laminated structure is exposed. In addition the laminated structure must be clear and colorless, and must remain so permanently even after prolonged exposure to light and heat. A further requisite of nonshattering glass is resistance to temperature changes. The plastic portion of the structure must remain strong and flexible at low temperatures and must not be unduly softened at elevated temperatures so that if the glass is broken the shock will be absorbed by the plastic and the fragments of glass will remain bonded thereto.

The foregoing characteristics may be said to define an ideal nonshattering glass. None of the structures heretofore known possess all of these properties, and the principal defect in known laminated glass structures is that the plastic portion is not adequately flexible at low temperatures.

The objects of this invention are to overcome this defect in nonshattering laminated glass structures and to provide a laminated glass which more nearly possesses all of the properties of an ideal safety glass than any of the structures heretofore known.

These objects can be attained by using as the plastic portion of such structures certain artificial resinous substances produced by the incomplete reaction of polyvinyl alcohol with aldehydes.

It is known that polyvinyl alcohol (obtainable by the saponification or hydrolysis of polymerized vinyl esters) may be reacted with aldehydes to form resinous materials. These materials are thermoplastic, and differ from polyvinyl alcohol itself in that they are not soluble in water, but are soluble in a wide variety of organic substances including many water-insoluble solvents. As in the case with simple alcohols, polyvinyl alcohol combines with aldehydes in the proportion of two molecular equivalents of its theoretical monomer, vinyl alcohol, to each molecule of aldehyde. Because these reaction products are analogous to the alkylidene diethers, or acetals, they may be called polyvinyl acetal resins. The degree of completeness with which the alcoholic hydroxyl groups in the polyvinyl macromolecule have been combined with aldehyde in the polyvinyl acetal resins may be indicated directly as percent acetalization.

Polyvinyl acetal resins may be combined with plasticizers to yield softened plastic compositions. Owing to their solubility in organic solvents, these resins are completely miscible with the usual plasticizers, and when so plasticized they behave in much the same manner as other plasticizer-soluble resins and cellulose esters. That is, the softness of the compositions is proportional to the quantity of plasticizer incorporated while the tensile strength and fusion temperature decrease progressively as the amount of plasticizer is increased. As a result polyvinyl acetal resins sufficiently plasticized to form compositions which have good flexibility and extensibility characteristics suffer a pronounced loss in strength, and the compositions soften at unduly low temperatures.

I have discovered a class of polyvinyl acetal resins which are remarkably well suited for use as the plastic portion of nonshattering laminated glass because they are free from the above defects. They may be colloided with water-insoluble plasticizers to yield compositions of excellent clarity and adhesiveness which have lasting qualities of flexibility, resilience and extensibility coupled with great strength and toughness. In addition, these new resins, when plasticized do not suffer from a lowering of their softening temperatures to an extent as great as do previously known polyvinyl acetal resins.

The polyvinyl acetal resins contemplated by this invention are not soluble in water, but unlike the usual polyvinyl acetal resins, they also are, in general, not soluble in water-insoluble organic solvents at ordinary temperatures. (The term "ordinary temperatures", as used herein, refers to temperatures below 40° C.) For this reason they are not dissolved by ester plasticizers, although the new resins themselves have the unique property of dissolving sufficient quantities of ester plasticizers to yield adequately softened compositions.

These new resins which are so admirably suited for use in laminated glass structures may be termed partial polyvinyl acetal resins, since they comprise polymeric vinyl bodies in which definite proportions of the functional groups are combined in acetal-type linkage with certain aldehydes, while practically all of the remainder exist as free hydroxyl groups. Partial polyvinyl acetal resins contemplated by this invention may result from the incomplete reaction of the aldehydes with polyvinyl alcohol, and this reaction may occur simultaneously with or subsequently to the formation of the polyvinyl alcohol from polyvinyl esters. Generally, these resins must be made from polyvinyl bodies, such as polyvinyl alcohol or esters, having molecular weights of at least 7,000 in order to obtain compositions of sufficient tensile strength, and resins made from polyvinyl compounds having molecular weights of at least 15,000 are desirable. Those resins derived from polyvinyl bodies of molecular weights in excess of about 25,000 yield plasticized compositions of exceptionally high tensile strength, and are the resins preferred in this invention. (Molecular weights referred to herein are calculated by means of Staudinger's formula from viscosity determinations on solutions of the materials.)

A number of methods have been proposed for making partial polyvinyl acetal resins, and this invention is applicable to the fabrication of laminated glass structures from resins having the properties herein specified, however they are made.

Not all partial polyvinyl acetal resins possess desirable properties, nor are all such resins suitable for the fabrication of nonshattering laminated glass structures. The resins contemplated by this invention are limited both by the nature and quantity of the aldehyde contained in the molecule. Not only do polyvinyl acetal resins become increasingly soluble in a wider variety of organic solvents (and correspondingly less water absorptive) as the degree of acetalization increases, but this increased solubility also results from the use of aldehydes of increasing molecular weight, and these two factors in the same way lower the softening temperature of the resin. Thus, resins made from formaldehyde, even when highly acetalized, retain too great an affinity for water, have excessively high softening temperatures, and possess insufficient solvent power for or compatibility with ester plasticizers to be truly desirable in the formation of plastic compositions. Formaldehyde does not appear to react with polyvinyl alcohol in the manner which is normal to other aldehydes, and a polyvinyl acetal resin which has the remarkable characteristic properties of the resins suitable for use in this invention cannot be made from formaldehyde alone regardless of the degree of acetalization. Resins made from aldehydes of molecular weights greater than that of hexaldehyde, even when acetalized only to the extent of around 30% to 35%, soften at very low temperatures, and being completely miscible with ester plasticizers, are also undesirable for the above reason.

The partial polyvinyl acetal resins of this invention may be made from aliphatic aldehydes having from two to six carbon atoms in the molecule, and these aldehydes preferably are saturated and of unbranched-chain structure. The degree of acetalization to yield desirable resins with aldehydes of this group depends upon the particular aldehyde employed, but the useful limits for all of the aldehydes of this group are contained within the broad range of 33% to 95%, regardless of whether they are employed singly, or two or more together to yield partial polyvinyl acetal resins of mixed aldehyde content, the total amount of which is within this range. Specifically, partial polyvinyl acetal resins made from butyraldehyde, propionaldehyde and valeraldehyde are preferred in the order named. The most desirable resins are those which are acetalized between about 52% and 92% in the case of propionaldehyde; between about 42% and 82% with butyraldehyde; and between about 33% and 62% with valeraldehyde. Of this group, I have determined that especially valuable resins are those made from butyraldehyde acetalized between about 54% and 78%, and those made from propionaldehyde acetalized between about 62% and 88%, and those made from valeraldehyde acetalized between 39% and 58%.

The particular class of resins included within the scope of this invention is illustrated by the accompanying drawings in which.

Figure 1:
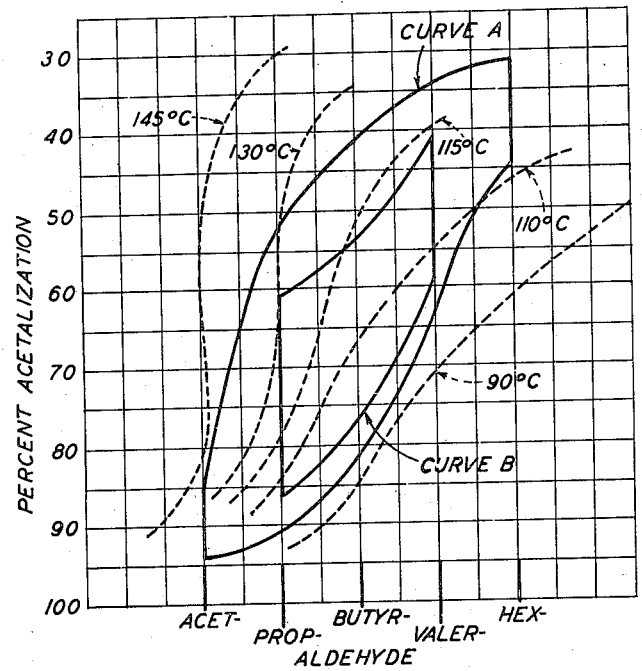
Fig. 1 is a chart comparing the relative softening temperatures of various polyvinyl acetal resins, and graphically defining the resins of my invention.

Referring to Fig. 1, the isothermal curves show how the softening temperatures of the polyvinyl acetal resins change with degree and kind of acetalization. Within the field of composition represented by this chart the area enclosed by Curve A indicates approximately the range of desirable resin compositions, and the smaller area enclosed by Curve B, and within the larger area of Curve A, indicates generally the composition range of the preferred resins of this invention.

Resins which come within Curve A in Fig. 1, have certain characteristic solubilities in non-aqueous solvents. For example, they are, in general, insoluble at ordinary temperatures in water-insoluble liquids, such as aliphatic and aromatic hydrocarbons, ethylene dichloride, chloroform, methylene chloride, ethyl acetate, etc., with the exception that portions of the more highly acetalized resins described may dissolve in certain of the chlorinated hydrocarbons. These resins are, in general, soluble in water-soluble liquids, such as alcohols, glycol monoalkyl ethers, and the like, except polyvinyl valeraldehyde acetals which are insoluble in the lower alcohols. Like the chlorinated hydrocarbons, ketones are capable of dissolving portions of the more highly acetalized resins, but this partial solubility in the ketones and chlorinated hydrocarbons in no way indicates that such resins are beyond the range of those having the remarkable properties discussed. In fact, the most outstanding chara..r- istic of a resin (having, when plasticiz ' g.eat ultimate strength and extreme extensi... v), is its virtual insolubility in ester plasticizer at ordinary temperatures, coupled with the capacity of the resin itself to absorb sufficient quantities of the plasticizer to give an adequately softened composition. None of these resins is in any case soluble in water. Those resins which lie to the left of and above the desirable area are soluble in methanol, but have high water absorption, are not sufficiently compatible with ester plasticizers, and lack sufficient thermoplasticity. The resins which lie to the right of and below the desirable area are too thermoplastic, and they are miscible with ester plasticizers in all proportions at room temperature.

Figure 2:
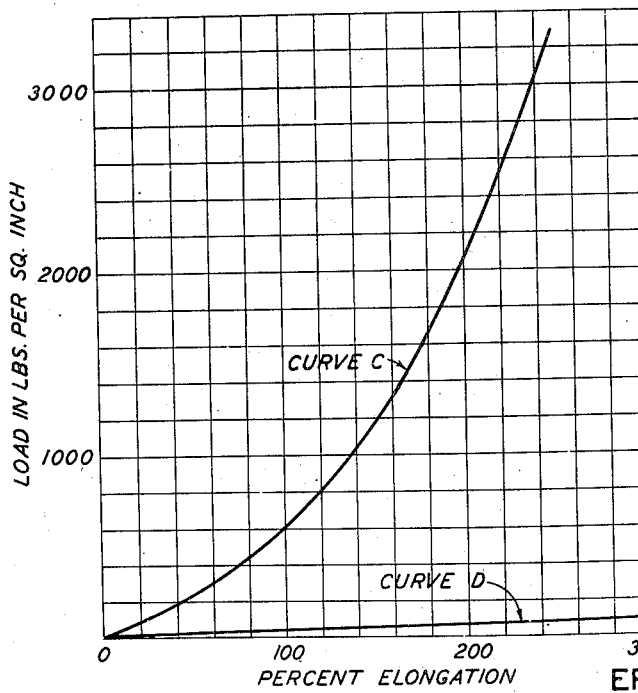
Fig. 2 is a comparison of certain properties of two specific polyvinyl acetal resins.

The unusual and very desirable stress-strain characteristics of these particular resins may be described as the ability of the resins, when combined with a plasticizer which does not dissolve them at ordinary temperatures, to have relatively high elongations with surprisingly high ultimate strengths. Fig. 2 illustrates this point. This figure presents graphically the stress-strain characteristics of two plastic compositions tested under identical conditions. Curve C represents the test of a resin embodying this invention, and was plotted from data obtained from a composition consisting of 69% by weight of a partial polyvinyl acetal resin 66% acetalized with butyraldehyde, colloided with 31% by weight of triethylene glycol di(2-ethyl butyrate). At atmospheric temperatures this resin is insoluble in the plasticizer. From Curve C it will be seen that this composition possessed an elongation of about 250% with an ultimate tensile strength materially in excess of 3000 pounds per square inch. Curve D represents the stress-strain properties of a composition also containing 31% by weight of triethylene glycol di(2-ethyl butyrate) and 69% by weight of a polyvinyl acetal resin, but the resin in this case was more than 85% acetalized with butyraldehyde, and was almost completely soluble in the plasticizer at ordinary temperatures. It will be seen from Curve D that this composition was vastly different from the one represented by Curve C, for although its elongation was around 300%, its ultimate tensile strength was less than 100 pounds per square inch.

It is this elastic property of the plasticized compositions which makes the partial polyvinyl acetal resins described so useful in the manufacture of nonshattering glass, and that also distinguishes them from the known polyvinyl acetals.

Although the amount of plasticizer which may be incorporated with these resins to yield softened compositions is not limited to any particular quantity, the most desirable compositions contain from about 25% to about 50% of plasticizer by weight, and the preferred amount is around 30% by weight of the total composition.

There are various ways in which the ester plasticizers may be incorporated with the resin. Thus, a mixture of the resin and plasticizer may be milled at a temperature sufficiently elevated to cause the mass to become homogeneous, or they may be combined through the aid of a volatile fluid which may be a non-solvent, or partial solvent for the resin, the fluid being removed from the resin either during incorporation of the plasticizer or during the fabrication of the composition into sheets. Since the granulated or powdered resin usually will absorb the plasticizer at room temperature without the particles becoming agglomerated, the addition of a volatile fluid which will not appreciably dissolve the resin, but will swell it, is generally preferred, for by this method a relatively short milling operation at a slightly elevated temperature will produce a composition which is clear and homogeneous, and sheets made from it are entirely free from ripples and undispersed resin particles.

Although volatile fluids which are miscible with the ester plasticizer (such as acetone or ether) may be used with very satisfactory results, it is not necessary that the volatile fluid be miscible with the plasticizer, and exceptionally homogeneous compositions may be obtained by incorporating the plasticizer with the aid of immiscible liquids, such as water. As a rule, the granulated resin contains a considerable amount of occluded water upon removal from the reaction chamber in which it is prepared. This wet product may be incorporated with the plasticizer directly by mixing the two thoroughly at an elevated temperature. A large part of the water thereupon separates from the mix and may be decanted or evaporated. When the mass has become clear, the water content will have fallen low enough so that the remainder can be completely eliminated by conditioning the sheeted composition for a few hours at a temperature of about 60° C.

After colloiding the resin with the ester plasticizer the plasticized composition is formed into sheets either by extrusion, calendering, or by evaporation of a solution of the composition. If the latter method is used, the solution may be spread directly on the glass and the solvent evaporated to form the sheet already bonded to one glass layer. However, it is usually more advantageous to fabricate the resin sheet of the desired thickness and then to bond it to the glass layers by means of heat and pressure. Any of the known methods for extrusion or calendering of plastics is applicable to the fabrication of these partial polyvinyl acetal resin sheets inasmuch as these resins lend themselves to such operations more easily than other known plastics. Particularly desirable results are secured when the plasticized composition to be extruded contains about 2% water, or, if it is to be calendered, a water content of .5% to 12% may be used to advantage. This water is removed from the sheets by drying at a temperature around 60° C. prior to bonding to glass.

Sheets made from these plasticized compositions are bonded to glass laminae by means of heat and pressure applied, for example, in the so-called autoclave process. The pressures and temperatures which may be employed for forming such laminated glass structures may be chosen from wide ranges. However, the most desirable combination is achieved where a minimum pressure is necessary to obtain adequate adhesion between the glass and resin at a temperature below the melting point of the plasticized composition. In general, it has been found that pressures from 100 to 300 pounds per square inch and temperatures of approximately 90° to 150° C. give satisfactory results.

To illustrate some of the typical methods whereby nonshattering laminated glass structures are made in accordance with this invention the following examples are given:

*Example I*

Ninety parts by weight of dibutyl phthalate were dissolved in 200 parts by weight of diethyl ether, and the solution was stirred into 200 parts by weight of a partial polyvinyl acetal which was about 66% acetalized with butyraldehyde. After this mass had remained at about 50° C. for thirty minutes, most of the ether was removed by milling the resin on a differential roll mill at 40° to 60° C. The composition was then milled at 80° C. for a few minutes to eliminate the remaining traces of ether. A thick sheet of the composition was transferred to a calender with a roll temperature of about 70° C. where a sheet 0.025 inch thick was formed by a single pass through two, almost equal speed rolls. This sheet was transparent, bubble-free, and had smooth surfaces. Upon removal from the calender, the sheet was carefully placed against a previously cleaned glass plate, care being taken to prevent the inclusion of large air bubbles between the plastic and the glass. A second glass plate was then placed against the other side of the resin, and the composite structure, or "sandwich", was passed between a pair of rollers to squeeze out substantially all of the remaining air. In order to effect an adequate and uniform bond between the glass and plastic, the sandwich was placed in a steam heated autoclave and completely covered with ethylene glycol. After closing the autoclave the temperature of the glycol was raised to about 120° C. and the pressure increased to about 150 pounds per square inch by means of compressed air. These conditions were maintained for a short time, after which the glycol was slowly cooled with circulating cold water, while maintaining the pressure constant to prevent the formation of air bubbles between the plastic and glass. When the glycol had been cooled to about 75° C., the pressure was released and the sandwich removed, cooled to room temperature, and washed with water to remove the adhering glycol. The resulting laminated glass structure was perfectly transparent, homogeneous, and free from bubbles.

*Example II*

Sixty-nine parts by weight of the partial polyvinyl resin described in Example I, in dry form, and 64 parts by weight of distilled water were heated at 90° to 100° C. for approximately 20 minutes in an open container. At the end of this time, 31 parts by weight of di(beta-butoxyethyl) phthalate were stirred into the mass, and the mixture covered. After standing over night, this mass was placed on a differential roll mill, the rolls of which were heated internally with steam at a pressure of about 10 pounds per square inch. Fluxing of the mass was rapid, with the elimination of water, and after three or four minutes the composition was entirely clear and homogeneous. At this point the water content had dropped to within 1% to 2%, and the plastic was charged into a batch-type hydraulic extrusion machine. Maintaining a cylinder temperature of 100° to 135° C., and a die temperature of approximately 145° C., the resin was extruded in sheet form with immediate cooling by immersion in cold water. The uniform, smooth and bubble free sheets obtained in this way were interposed between sheets of glass, and bonded as described in Example I to form perfectly transparent and homogeneous nonshattering, laminated glass structures.

*Example III*

A partial polyvinyl acetal resin prepared from polyvinyl acetate having an average macromolecular weight of about 27,000 and which was about 67% acetalized with butyraldehyde was taken from the final precipitation stage of the process by which it was made, and in which state it was found to contain 53% by weight of solids, the balance being water. To 13 parts by weight of this wet resin were added 3.1 parts by weight of triethylene glycol di(2-ethyl butyrate) while the wet mass was being mixed in a dough-type mixer. The mixing was continued, allowing the water to evaporate, until the mass was completely homogeneous, and the temperature of the batch was still below 110° C. At this stage evaporation of the water was checked by partially sealing the mixer, and the water content of the batch adjusted to approximately 8% by addition of distilled water. The batch was then cooled to a temperature of about 90° C. and charged into a two roll mill, having a roll temperature of approximately 40° C. After a double pass through this mill, a thick sheet of plastic was charged to the calender with a roll temperature of 71° C. Sheets 0.010 inch and 0.015 inch thick were formed by a single pass through two, almost equal speed, rolls. These sheets were clear and transparent, and were bubble-free and had smooth surfaces with an overall variation in thickness of 0.003 inch. As the sheets were removed from the calender, they were dusted with a powder, such as sodium bicarbonate, to prevent sticking when folded or formed into a roll. Prior to laminating into nonshatterable glass, the powder was removed by washing, and the sheet material dried for a short time at about 60° C. to remove the very small amount of residual water. These sheets were placed between sheets of glass and composited as described in Example I to form a laminated structure.

This product, like the laminated structures previously described, was colorless and clear and remained so.

Tests upon laminated glass structures made in accordance with this invention have shown that they are far superior to any known nonshattering glass compositions both as to shatterproof characteristics and ability to withstand the deleterious action of actinic light. A comparison of the shatter-proof qualities of these compositions with the known laminated glass structures is given in the following table in which are shown the vertical heights from which a one-half pound steel ball must be allowed to drop onto a sample of laminated glass 12 inches square to cause failure. In these tests, failure occurs when the falling ball penetrates the laminated sheets.

| Reinforcing sheet | Thickness of sheet (inch) | Height (feet) | | |
|---|---|---|---|---|
| | | 0° F. | 70° F. | 120° F. |
| E | 0.025 | 40 | 100 | 45 |
| F | 0.030 | No failure at 130 | | |
| G | 0.020 | 2.5 | 20 | 22 |
| H | 0.025 | 2.0 | 40 | 12 |
| J | 0.025 | 2.0 | 30 | 32 |

The reinforcing sheets E and F were made according to this invention, and were identical except in thickness. Both sheets E and F were formed of a composition of a partial polyvinyl acetal resin 66% acetalized with butyraldehyde combined with triethylene glycol di(2-ethyl butyrate) to the extent of 31% by weight of the composition. Sheet G was a plasticized nitrocellulose composition. Sheet H was a plastic composition of polymerized acrylate resin, and sheet J was a plasticized cellulose acetate composition. Sheets G, H and J were formed of commercially available materials heretofore employed in nonshattering glass.

Figure 3:
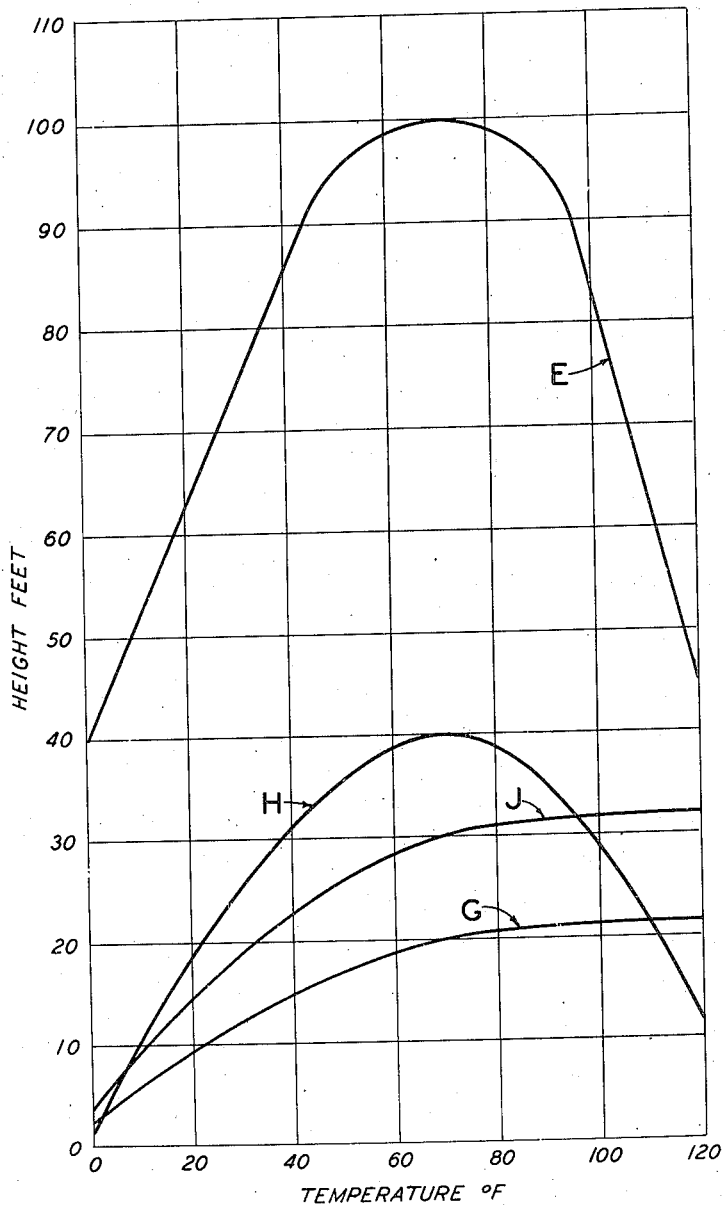
Fig. 3 is a graphical comparison of laminated glass embodying this invention and other forms of laminated glass.

To illustrate more clearly the extraordinary difference between the nonshattering glass structures of this invention and the other composite glass compositions, the data in the above table is presented graphically in Fig. 3.

The exceptional resistance of the laminated glass structures of this invention to deterioration or discoloration upon exposure to actinic light is demonstrated by the following test in which the samples were exposed at a temperature not exceeding 130° F. to ultra-violet light from a mercury arc placed 10.5 inches away. The materials were in each case laminated between sheets of white glass, and were present in the thicknesses normally used in commercial laminated glass.

Light test

| | Hours | |
|---|---|---|
| Partial polyvinyl acetal resin about 70% acetalized with butyraldehyde. | 1,000 | No change in color. |
| Cellulose acetate | 1,000 | Light yellow. |
| Acrylate resin | 1,000 | Medium yellow. |
| Cellulose nitrate | 200 | Brown. |

Many modifications of this invention, both as to the composition of the plastic layer and as to the laminated glass structure itself, will be apparent to those skilled in the art. For example, if large variations are made in the amount of plasticizer to be incorporated in the resin, or allowable water absorption, or softening point, partial polyvinyl acetal resins may be chosen which vary considerably from the preferred ones of this invention. In addition, the resins may contain a limited proportion of ester, ketone, other aldehyde, or functional groups normally foreign to the partial polyvinyl acetal resins of this invention without any appreciable loss in desirable stress-strain characteristics, provided that the proportion of these unessential groups is insufficient to affect the solubility properties which are characteristic of these resins.

The degrees of acetalization reported in the preceding examples were calculated from the quantities of aldehyde combined in the resins and determined by the following method:

A two-gram sample of dry resin is accurately weighed and placed in a 500 cc. Erlenmeyer flask with 50 cc. of normal butanol and 50 cc. of half normal hydroxylamine hydrochloride solution. The mixture is then refluxed for two hours in parallel with a blank. Thereafter, 50 cc. of methanol is added together with bromphenol blue indicator, and the mixture titrated with half normal sodium hydroxide solution. From the difference between the titrations of the sample and the blank, there may be calculated the amount of hydrochloric acid liberated from the hydroxylamine hydrochloride on the combination of hydroxylamine with aldehyde. From this value the quantity of aldehyde present in the resin, or its degree of acetalization, may be calculated.

As for the nonshattering laminated glass structures, it may be desirable for some purposes to make them containing interposed layers of other plastics (such as nitrocellulose, cellulose acetate, other cellulose derivatives, vinyl ester resins, alkyd resins, styrene polymerization products, etc.) in addition to one or more layers of a partial polyvinyl acetal resin. In such cases the partial polyvinyl acetal resin may advantageously be used as the bonding material between the glass and other plastic layers, and nonshattering laminated glass structures in which the several laminae are bonded by means of a partial polyvinyl acetal resin are included within the scope of this invention. The laminated glass products of this invention are characterized by the excellent adhesion of the resin layers to the glass, by their clarity, lack of color, resistance to discoloration or deterioration upon prolonged exposure to actinic light, and exceptionally high resistance to failure from shock at both elevated temperatures (such as 120° F.) and very low temperatures (such as minus 20° F.).

Many modifications may be made within the scope of this invention which should not be limited other than as defined by the appended claims.

This application is a continuation-in-part of application Serial No. 742,007, filed August 29, 1934.

I claim:

1. An article of manufacture comprising at least one layer of glass and a plastic layer adhering to said glass by its own adhesive properties, said plastic layer being essentially composed of a polyvinyl acetal resin which is acetalized with one of the group consisting of acetaldehyde, propionaldehyde, butyraldehyde, valeraldehyde and hexaldehyde within the ranges consisting of about 85% to about 94%, about 52% to about 92%, about 42% to about 82%, about 33% to about 62%, and about 31% to about 45%, respectively, said resin being derived from a polyvinyl ester of average macromolecular weight in excess of 7,000, said resin containing such proportion of free hydroxyl groups and such acetal groups and being sufficiently free of other groups that said resin has the capacity to absorb substantial quantities of water-insoluble ester plasticizers while being virtually insoluble in said plasticizers at ordinary temperatures.

2. An article of manufacture comprising at least one layer of glass and a plastic layer adhering to said glass by its own adhesive properties, said plastic layer being essentially composed of a partial polyvinyl acetal resin acetalized with butyraldehyde between about 54% and about 78%, said resin being derived from a polyvinyl ester of average macromolecular weight in excess of 15,000, and the degree of acetalization with butyraldehyde and the proportion of free hydroxyl groups in said resin being so correlated that said resin is compatible with substantial quantities of water-insoluble ester plasticizers while being virtually insoluble in said plasticizers at ordinary temperatures.

3. An article of manufacture comprising at least one layer of glass and a plastic layer adhering to said glass by its own adhesive properties, said plastic layer being essentially composed of a partial polyvinyl acetal resin substantially identical with a polyvinyl acetal resin containing free hydroxyl groups, acetal groups, and substantially no others and resulting from the condensation of polyvinyl alcohol with an aldehyde of the group consisting of acetaldehyde, propionaldehyde, butyraldehyde, valeraldehyde and hexaldehyde to an extent within the ranges consisting of about 85% to about 94%, about 52% to about 92%, about 42% to about 82%, about 33% to about 62%, and about 31% to about 45%, respectively, said aldehyde, the degree of acetalization and the proportion of free hydroxyl groups in said resin being so correlated that said resin has the capacity to absorb substantial quantities of water-insoluble ester plasticizers while being virtually insoluble in said plasticizers at ordinary temperatures.

4. An article of manufacture comprising at least one layer of glass and a plastic layer adhering to said glass by its own adhesive properties, said plastic layer being essentially composed of a partial polyvinyl acetal resin substantially identical with a polyvinyl acetal resin resulting from the condensation of polyvinyl alcohol derived from a polyvinyl ester of average macromolecular weight in excess of 7,000, with aldehyde sufficient to combine with from about 33% to about 95% of the hydroxyl groups of said polyvinyl alcohol, said aldehyde comprising at least one saturated aliphatic aldehyde having from 2 to 6 carbon atoms in its molecule, the kind of aldehyde, the extent of aldehyde combination with said polyvinyl alcohol and the free hydroxyl groups thereof being so correlated that said resin is substantially insoluble in water-insoluble ester plasticizers at ordinary temperatures but is compatible with substantial quantities of water-insoluble ester plasticizers to yield with said plasticizers homogeneous compositions having an elongation in excess of about 200% and an ultimate strength above about 2,000 pounds per square inch at ordinary temperatures.

5. An article of manufacture comprising a structure resistant to shattering formed of at least two sheets of glass and an interposed plastic layer adhering to said glass by its own adhesive properties, said plastic layer being essentially composed of a water-insoluble ester plasticizer and a partial polyvinyl acetal resin substantially identical with a polyvinyl acetal resin containing free hydroxyl groups, acetal groups and substantially no others and resulting from the condensation of polyvinyl alcohol with an aldehyde of the group consisting of acetaldehyde, propionaldehyde, butyraldehyde, valeraldehyde and hexaldehyde to an extent within the ranges consisting of about 85% to about 94%, about 52% to about 92%, about 42% to about 82%, about 33% to about 62%, and about 31% to about 45%, respectively, said aldehyde, the degree of acetalization and the proportion of free hydroxyl groups being so correlated that said resin has the capacity to absorb substantial quantities of said water-insoluble ester plasticizer while being virtually insoluble in said plasticizer at ordinary temperatures.

6. An article of manufacture comprising a structure resistant to shattering formed of at least two sheets of glass and an interposed plastic layer adhering to said glass by its own adhesive properties, said plastic layer being essentially composed of a water-insoluble ester plasticizer and a partial polyvinyl acetal resin substantially identical with a resin resulting from the condensation of polyvinyl alcohol derived from a polyvinyl ester of average macromolecular weight in excess of 7,000, with aldehyde sufficient to combine with from about 33% to about 95% of the hydroxyl groups of said polyvinyl alcohol, said aldehyde comprising at least one saturated aliphatic aldehyde having from 2 to 6 carbon atoms in its molecule, the kind of aldehyde, the extent of aldehyde combination with said polyvinyl alcohol, and the free hydroxyl groups thereof being so correlated that said resin is substantially insoluble in said water-insoluble ester plasticizer at ordinary temperatures but is compatible with substantial quantities of said water-insoluble ester plasticizer to yield in combination therewith homogeneous compositions having an elongation in excess of about 200% and an ultimate strength above about 2,000 pounds per square inch at ordinary temperatures.

7. An article of manufacture comprising a structure resistant to shattering formed of at least two sheets of glass and an interposed plastic layer adhering to said glass by its own adhesive properties, said plastic layer being essentially composed of a water-insoluble ester plasticizer and a partial polyvinyl acetal resin substantially identical with a resin resulting from the condensation of polyvinyl alcohol derived from a polyvinyl ester of average macromolecular weight in excess of 15,000, with butyraldehyde to the extent of from about 54% to about 78%, and the degree of acetalization with butyraldehyde and the proportion of free hydroxyl groups in said resin being so correlated that said resin is compatible with substantial quantities of water-insoluble ester plasticizers while being virtually insoluble in said plasticizers at ordinary temperatures.

8. An article of manufacture comprising a structure resistant to shattering formed of at least two sheets of glass and an interposed plastic layer adhering to said glass by its own adhesive properties, said plastic layer being essentially composed of a water-insoluble ester plasticizer and a partial polyvinyl acetal resin substantially identical with a resin resulting from the condensation of polyvinyl alcohol derived from a polyvinyl ester of average macromolecular weight in excess of 15,000, with propionaldehyde to the extent of from about 62% to about 88%, and the degree of acetalization with propionaldehyde and the proportion of free hydroxyl groups in said resin being so correlated that said resin is compatible with substantial quantities of water-insoluble ester plasticizers while being virtually insoluble in said plasticizers at ordinary temperatures.

9. An article of manufacture comprising a structure resistant to shattering formed of at least two sheets of glass and an interposed plastic layer adhering to said glass by its own adhesive properties, said plastic layer being essentially composed of a water-insoluble ester plasticizer and a partial polyvinyl acetal resin substantially identical with a resin resulting from the condensation of polyvinyl alcohol derived from a polyvinyl ester of average macromolecular weight in excess of 15,000, with valeraldehyde to the extent of from about 39% to about 58%, and the degree of acetalization with valeraldehyde and the proportion of free hydroxyl groups in said resin being so correlated that said resin is compatible with substantial quantities of water-insoluble ester plasticizers while being virtually insoluble in said plasticizers at ordinary temperatures.

ERNEST W. REID.

CERTIFICATE OF CORRECTION.

Patent No. 2,120,628.  June 14, 1938.

ERNEST W. REID.

It is hereby certified that error appears in the printed specification of the above numbered patent requiring correction as follows: Page 4, second column, lines 36 to 45 inclusive, strike out the table and insert instead the following -

| Reinforcing Sheet | Thickness of Sheet (inches) | Height (feet) | | |
|---|---|---|---|---|
| | | 0°F. | 70°F. | 120°F. |
| E | 0.025 | 40 | 100 | 45 |
| F | 0.030 | - No failure at 130 - | | |
| G | 0.020 | 2.5 | 20 | 22 |
| H | 0.025 | 2.0 | 40 | 12 |
| J | 0.025 | 2.0 | 30 | 32 | and that the said Letters Patent should be read with this correction therein that the same may conform to the record of the case in the Patent Office.

Signed and sealed this 2nd day of August, A. D. 1938.

(Seal)

Leslie Frazer,
Acting Commissioner of Patents.